United States Patent [19]

Kaestner

[11] 4,347,680
[45] Sep. 7, 1982

[54] GILL NET HAULING AND FISH REMOVING SYSTEM

[76] Inventor: Eugene D. Kaestner, 208 Winesap Rd., Bothell, Wash. 98011

[21] Appl. No.: 146,278

[22] Filed: May 5, 1980

[51] Int. Cl.³ .............................................. A01K 74/00
[52] U.S. Cl. ............................................ 43/10; 43/8; 43/4.5; 254/394; 254/397
[58] Field of Search ............... 43/4.5, 6.5, 7, 8, 9, 43/10, 14; 114/241; 254/392, 394, 397, 413, 414, 415; 294/77

[56] References Cited

U.S. PATENT DOCUMENTS

| 371,987 | 10/1887 | Sowle | 43/14 |
|---|---|---|---|
| 724,467 | 4/1903 | Hansen | 43/10 |
| 1,863,989 | 6/1932 | Liisanatti | 43/8 |
| 2,478,486 | 8/1949 | Holleron et al. | 254/414 |
| 2,673,415 | 3/1954 | Strom | 43/4.5 |
| 2,875,547 | 3/1959 | Puretic | 43/8 |
| 3,047,973 | 8/1962 | Puretic | 43/8 |
| 3,861,651 | 1/1975 | Takamura | 43/8 X |
| 3,882,627 | 5/1975 | Takamura | 43/8 |
| 3,964,730 | 6/1976 | Demmert | 43/8 X |
| 4,204,354 | 5/1980 | Kane | 43/4.5 |

FOREIGN PATENT DOCUMENTS

| 76201 | 1/1950 | Norway | 43/7 |
|---|---|---|---|
| 115859 | 12/1968 | Norway | 43/8 |
| 175346 | 3/1966 | U.S.S.R. | 43/8 |
| 521870 | 7/1976 | U.S.S.R. | |

*Primary Examiner*—Stephen G. Kunin
*Assistant Examiner*—Robert P. Olszewski
*Attorney, Agent, or Firm*—Christensen, O'Connor, Johnson & Kindness

[57] ABSTRACT

An improved gill net hauling and fish picking system employing a net modified by incorporation of a longitudinal suspender line secured to the mesh along its length midway between cork line and lead line. With the suspender line caused to run over an elevated net guiding support, preferably in the form of a split sheave device, in approaching the storage drum, the halfwidth panels of the net draped from the suspender line are spread out and the mesh opened up to facilitate removal of fish therefrom.

5 Claims, 10 Drawing Figures

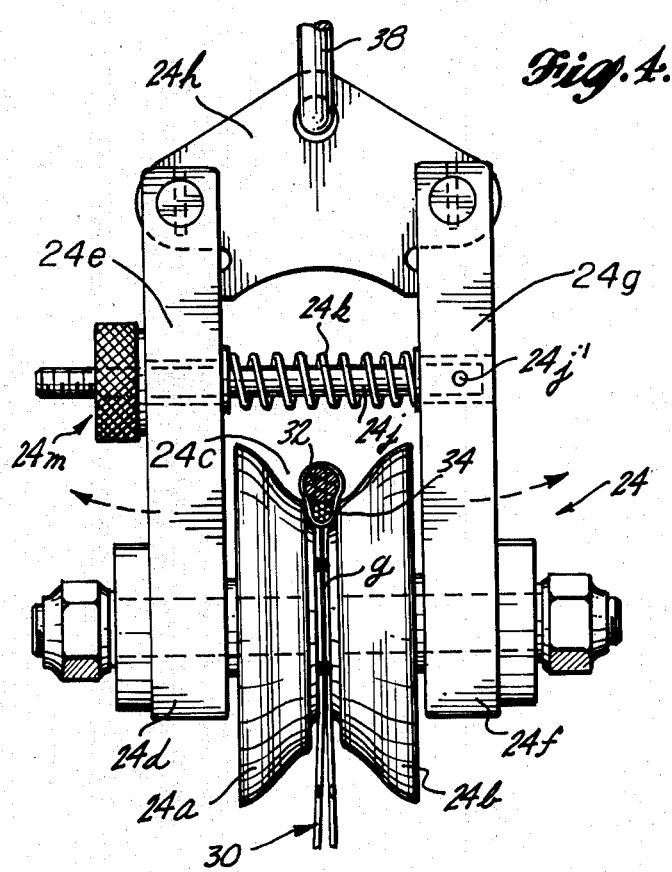
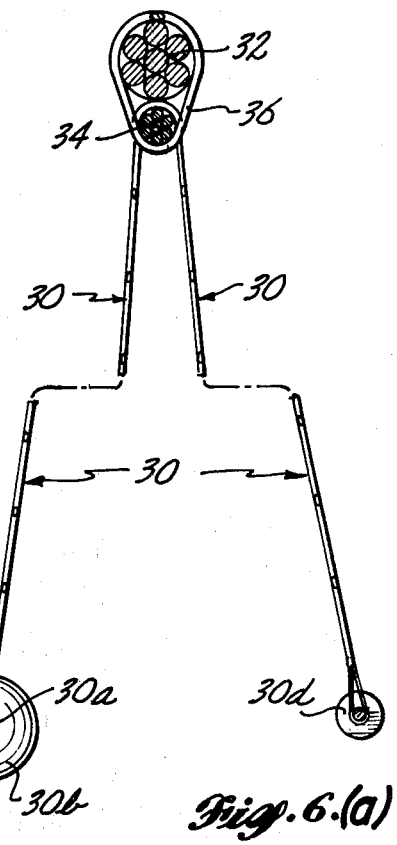
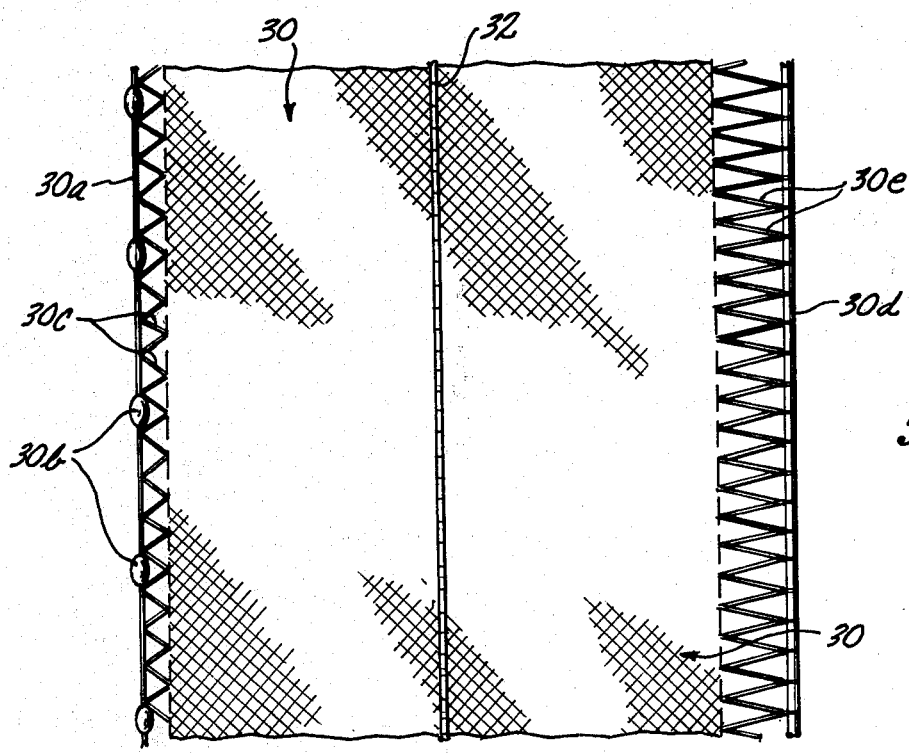
Fig. 4.
Fig. 6.(a)
Fig. 5.

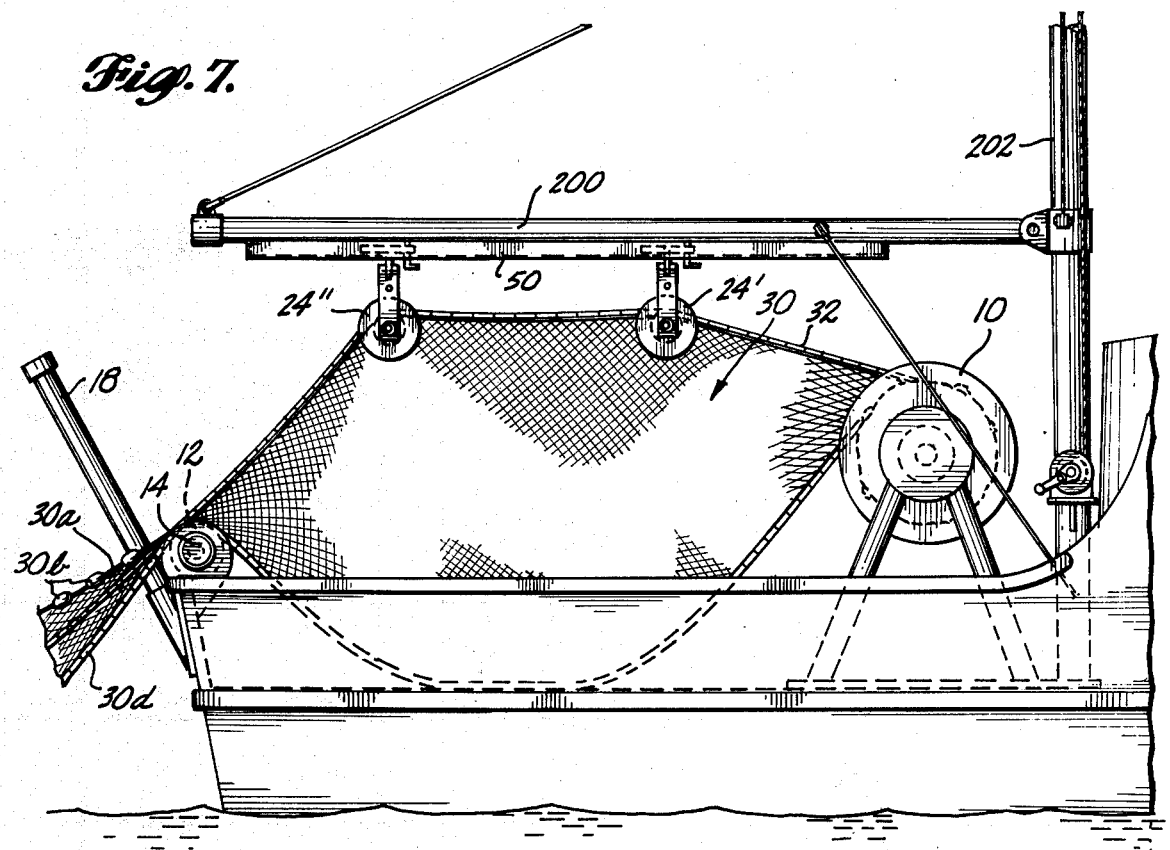
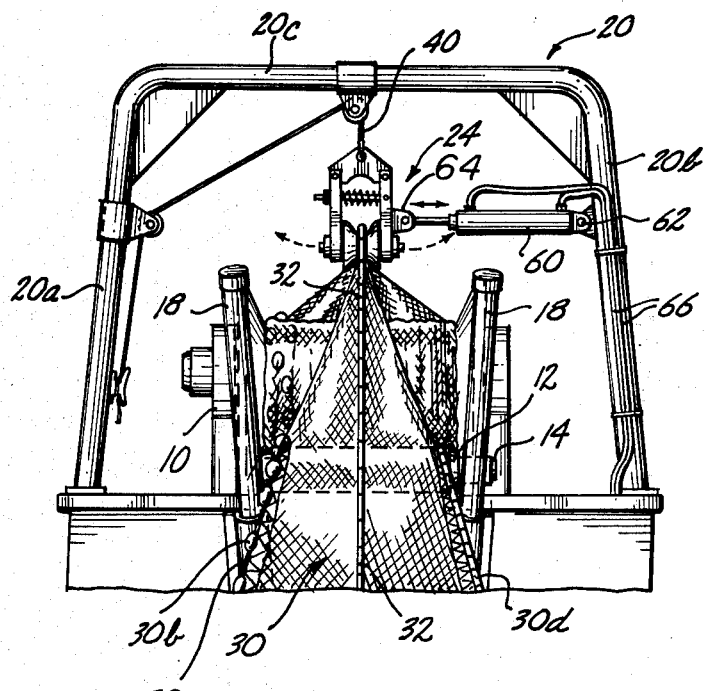

GILL NET HAULING AND FISH REMOVING SYSTEM

BACKGROUND OF THE INVENTION

This invention relates to improvements in techniques for gill netting of herring, salmon and other fish and, more particularly, concerns improvements that improve the speed and efficiency with which fish caught in the net can be removed during net hauling operations. The invention is herein illustratively described by reference to its presently preferred form and application; however, it will be appreciated that certain modifications and changes may be made without departing from the essential features involved.

Gill nets used in fishing for salmon in the Bristol Bay area, for example, are typically 14 feet wide (i.e., between cork line and lead line). Those used for herring are commonly 18 feet wide. On most vessels the net is hauled by a power driven storage drum. The net comes in over a horizontal stern roller as a compacted rope-like mass. On its way to the storage drum, it traverses an open deck area where the fisherman has access to it for picking off the fish while operating a treadle switch or hydraulic valve controlling the drum drive motor. The process of net hauling and attendant net picking can be quite slow and tedious. The fish are often buried in a mass of wraps and folds that must be opened up to get at them. Furthermore, fish are often lost overboard in the process. If the hauled net is first heaped on deck, the task of pulling apart the folds and spreading the mesh to remove the fish is very slow and laborious! The present invention is concerned with these problems and shortenings of present techniques. Its general objectives is to both facilitate and expedite the net hauling and fish removal operation while reducing overboard losses.

In accordance with this invention, a special gill net that can be manufactured at little or no greater cost than conventional nets cooperates with auxillary novel hauling gear that can readily be mounted on new vessels or as retrofit equipment on existing vessels over the open deck area between the takeup device and the incoming net guide. The improved system, which can be made to adjust for different net widths, not only facilitates removal of the catch, but also minimizes net damage during hauling and fish removal. It also facilitates removal of driftwood and other debris caught in the mesh before it reaches the take-up drum where entrapment compression forces can also tear the mesh. The improved system affords to the fisherman a convenient opportunity to inspect the net for damage and repair requirements in the process of hauling the catch. It thereby saves time in conducting separate inspections.

A further object of this invention is to provide a system which, with minor revision or addition to a conventional net, provides more favorable distribution of tension forces in the net during hauling, thereby lengthening its useful life and improving the uniformity of wrap on the storage drum when a drum is used as the take-up device.

Still another object of the invention is to provide a gill net hauling and fish picking system wherein a two-man crew can be used to maximum advantage with the efforts of one complementing rather than impeding those of the other.

A specific object is to devise an improved gill net hauling system that inherently opens the mesh of the net stretched under hauling tension so as to facilitate removal of fish whether by picking or by shaking of the net.

SUMMARY OF THE INVENTION

A characterizing feature of the present invention is the incorporation in the net of what may be termed a "suspender line", a line at least several times thicker than the net strands and maintained extending lengthwise of the net intermediate its top and bottom edges by distributed securement of the suspender line to the net strands along the length of the line. In effect, it is made an integral part of the net, as much so or more so than the float line and lead line. The manner of securement may vary, although one feature of design provided by this invention is to secure the suspender line on one side of the mesh by means of a smaller backing line placed on the opposite side of the mesh and to which it is secured by a spiraling series of ties lashing together the two lines and the intervening mesh of the net.

During net hauling, according to the invention, the incoming net tensioned by the take-up device is maintained in a draped or suspended configuration from an elevated net guiding support mounted over the open deck area by placing the suspender line in running engagement with the elevated net guiding support so that the net halves drape down from the suspender line. Thus, as the net is being hauled, the successive length portions of the two net panels hanging from the elevated support and approaching the take-up device are spread out vertically for convenient viewing and access by fishermen stationed on opposite sides of the net. Moreover, resultant spread of the mesh, otherwise vertically compressed by hauling tension, saves greatly on labor to remove the gill-caught fish and, incidently, of foreign objects such as pieces of driftwood and other items caught in the mesh and potentially damaging to the net. Fish shaken or picked from the net can then drop directly onto the deck or be tossed into an open hold with minimal loss of fish overboard as in prior experience.

If desired, the net may be shaken manually to dislodge fish or arrangements may be made for a mechanical shaking device such as one coupled to the elevated net guiding support.

The apparatus preferably includes means to vary the relative elevation of the net guiding support so as to accommodate nets of different width, that is, so that the suspended net panels reach down substantially to deck level. Preferably, the net guiding support is in the form of a split sheave with roller parts normally held in closely spaced relationship to support the suspender line or top while passing the hanging net panels between them. By separating the two parts of the sheave the suspender line itself will drop free through the gap between them.

These and other features, objects and advantages of the invention will become more fully evident from the following description thereof by reference to the accompanying drawings.

BRIEF DESCRIPTION OF THE DRAWINGS

FIG. 4 is an enlarged end elevation view of the preferred net guiding support, namely a split sheave device.

FIG. 5 is a fragmentary face view of a length portion of the preferred form of gill net having the widest range of utility following teachings of the invention.

FIG. 6(a) is a transverse sectional view of a portion of the net depicted in FIG. 5 with the net panels now folded over and suspended in the positioning they assume during hauling and picking operations.

FIG. 7 is a side elevation view of a modified apparatus.

FIG. 8 is a stern view of a vessel incorporating means to shake the net mechanically during hauling so as to remove fish therefrom.

DETAILED DESCRIPTION

Figure 1:
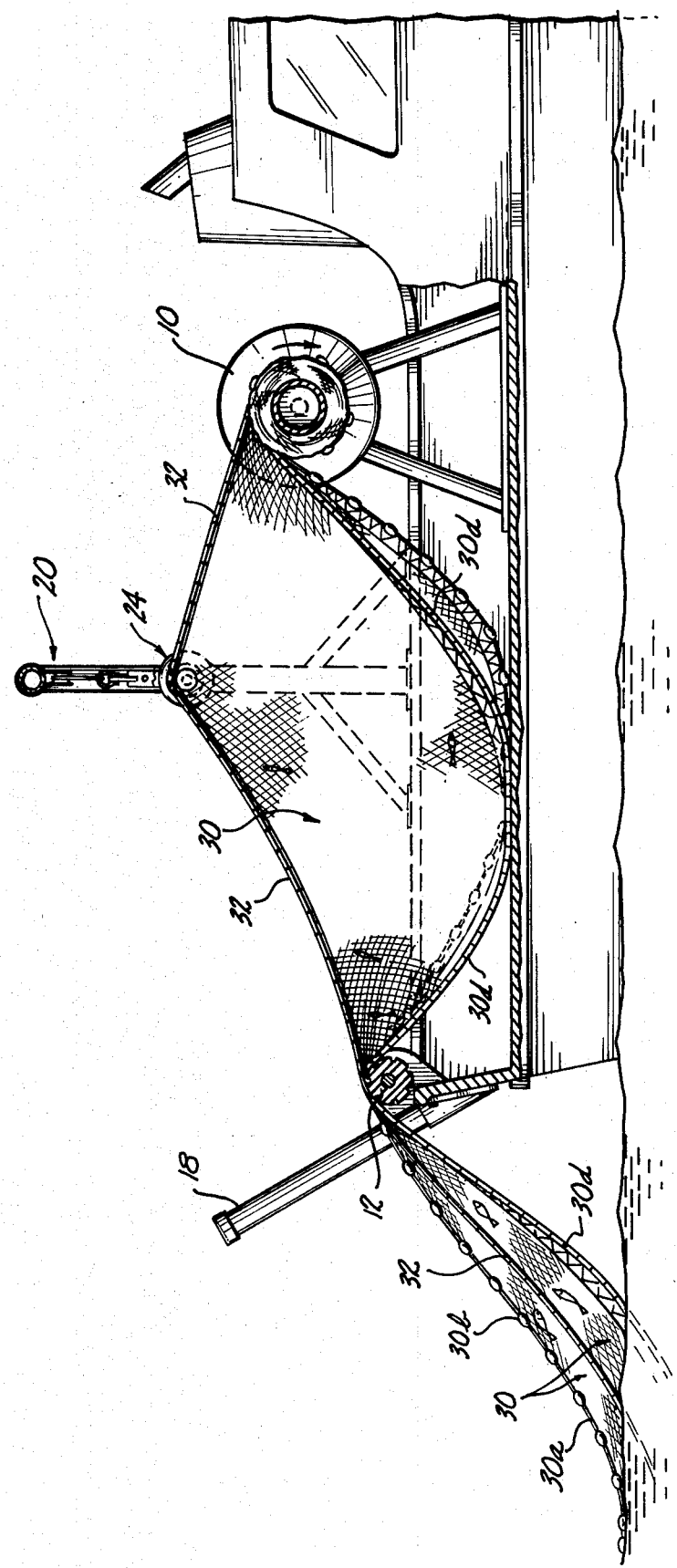
FIG. 1 is a side elevation view of a gill net vessel incorporating the invention.
Figure 2:
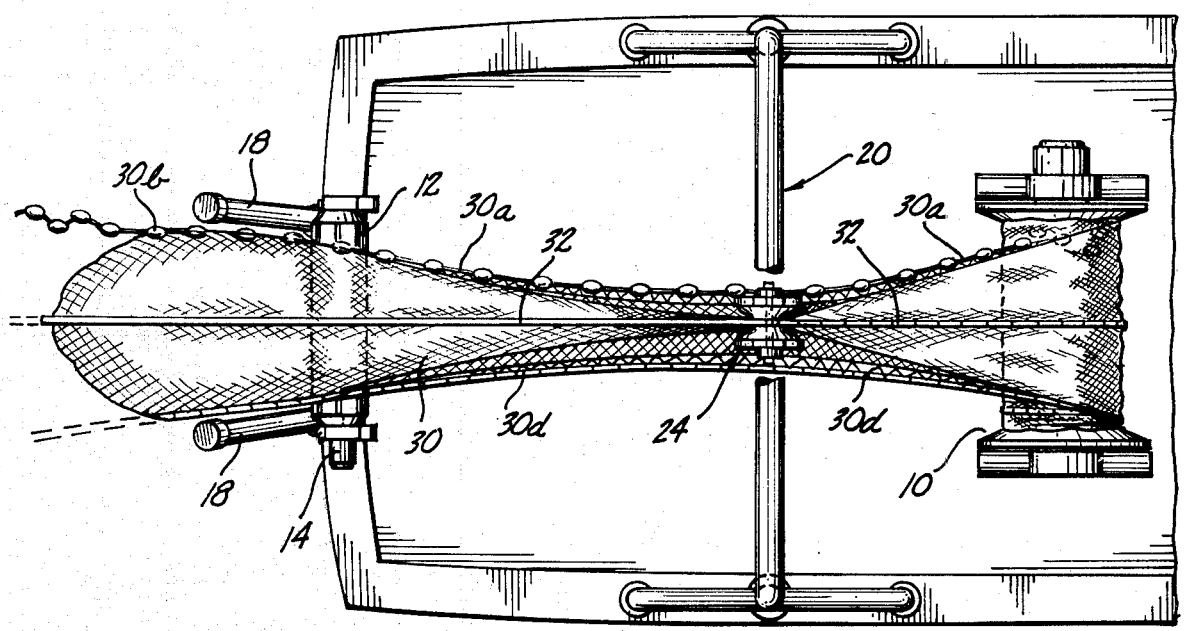
FIG. 2 is the top view of the same vessel.
Figure 3:
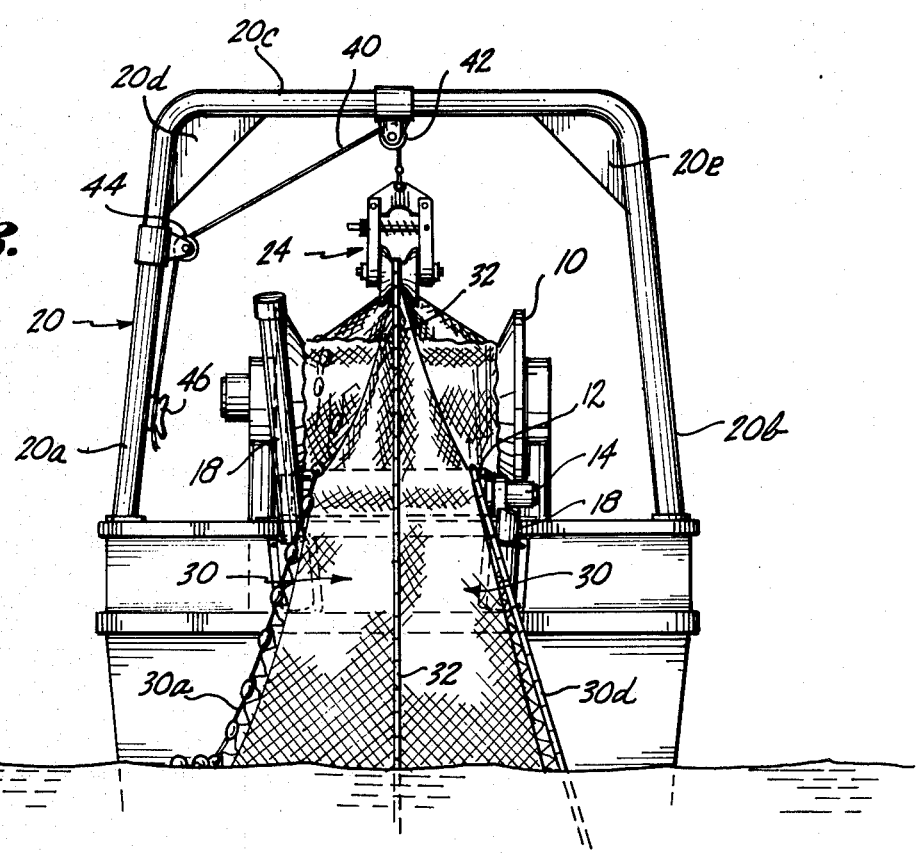
FIG. 3 is a stern view of the same vessel.

The fishing vessel depicted in FIGS. 1-3 represents a typical modern-day gill net vessel used in the Bristol Bay area of Alaska. Such a vessel may be of the order of 32 feet in length with a beam of about 12 feet. In a conventional installation the net hauling and storage drum is mounted to turn on a transverse horizontal axis several feet forwardly of the stern, leaving sufficient room for the operator to stand beside the incoming net to control application of drive power to the drum and to remove fish from the mesh as the net comes in. In accordance with the preferred arrangement of this invention, the net take-up device, such as the power driven storage drum 10, is mounted farther forward, and preferably at a somewhat higher relative elevation. The net guide, typically mounted over the stern, comprises a lower horizontal guide roller 12, an upper horizontal keeper roller 14 spaced above the roller 12, and upright arms or rollers 18 extending between corresponding ends of the rollers 12 and 14. The guide rollers form a protective frame that retains the net under varying conditions of rolling and pitching of the vessel so that the forwardly moving stretch of net drawn under tension by the take-up device 10 is always guided to advance over the open intervening deck area, in the example, approximately midway between the sides of the vessel.

The illustrated device includes an arched frame 20 comprising posts 20a and 20b mounted and braced at opposite sides of the vessel. These are interconnected at the top by a crossbar 20c and associated corner braces 20d and 20e. The frame is shown situated approximately midway between the stern roller 12 and the take-up drum 10, although to the extent practical, it should be placed nearer to the take-up drum than to the guide rollers. This frame can be designed for removability. Crossbar 20c is positioned at a relative height above deck level, preferably somewhat in excess of half the width of the widest net, such as a herring net, to be hauled aboard the vessel. Typically, for example, this crossbar 20c, which is to carry the net guiding support to be described, will be placed some ten or eleven feet above deck level. For some applications, such as when the net guiding support to be described is suspended well below the crossbar 20c to permit its movement back and forth transversely as part of a net shaker system, the crossbar 20c will preferably be mounted at an even greater elevation above deck level.

The net guiding support in the embodiment of the invention herein disclosed comprises a split sheave device 24 operable to maintain the successive length portions of the tensioned net approaching the take-up device in draped configuration suspended by its special suspender line 32 from a height sufficient that each half of the net hangs spread out vertically above the deck for observance by and access to the fisherman standing there as the incoming run of net approaches the take-up drum 10.

Before describing further details of the preferred net guiding support 24, the special net itself will now be described in its presently preferred form by reference to FIGS. 5 and 6(a). As shown, the net 30 is generally of elongated rectangular form. For salmon fishing in Bristol Bay the net is typically 14 feet wide and 150 fathoms long. For herring it is typically 18 feet wide and either 150 fathoms or 300 fathoms in length, depending upon whether the boat carries one or two net-licensed fishermen. A cork line 30a having floats or corks 30b at intervals along its length is suitably secured by lashing 30c to the top row of mesh. A weight line or lead line 30d, usually braided around lead wire or slugs, is similarly secured by lashing 30e to the bottom row of mesh in the usual manner. The net mesh is typically No. 8 monofilament nylon for herring. For red salmon, the net mesh is typically 18 strand, 210 denier nylon, and for chinooks, 36 strand, 210 denier nylon. At an intermediate position between the cork line and lead line is a line 32 which is herein termed the suspender line. It preferably extends down the middle the full length of the net and beyond its ends. The suspender line 32 is at least several times thicker than the mesh strands. Preferably, for a herring net, its diameter is about 7/16", but it may be as large as of the order of 1 inch in diameter. It is of a material and weave, braid or twist comparable to the cork line and lead line in the sense that it will not expand in length nor shrink in length much differently than the lead line or cork line; hence it does not tend to unduly shorten or lengthen the net in the middle.

The suspender line 32 is secured to the mesh of the net substantially continuously along the length of the line, or at close intervals along its length, so as to be in effect an integral part of the net. It is lashed along one face of the net in such manner that it may pass in running engagement over the adjacent rim surfaces of a split sheave while the panels of the net hanging freely from the suspender line lie closely adjacent each other and are there by able to be drawn edgewise between the sheave halves with minimum rubbing contact of the net strands with the sheave surfaces. This avoids excessive net wear. In FIG. 6, the preferred method of securement to achieve this relationship is depicted wherein the suspender line 32 is placed on one side of the net and a smaller backing line 34 (such as a 3/16" line of the same material as the suspender line) is placed on the opposite side of the net congruently to the suspended line. The lines are then lashed together by a spiraling series of turns around the two lines at a spiral pitch preferably equal to the net mesh interval along the full length of the net. The lashing cord 36 is drawn tight and tied tightly, preferably knotted, at each turn. This method of securement of the suspender line 32 distributes the stresses over the length of the net and permits the suspender line to serve as a major load bearing line in the hauling operation as will more fully appear from the description that follows.

Figure 6B:
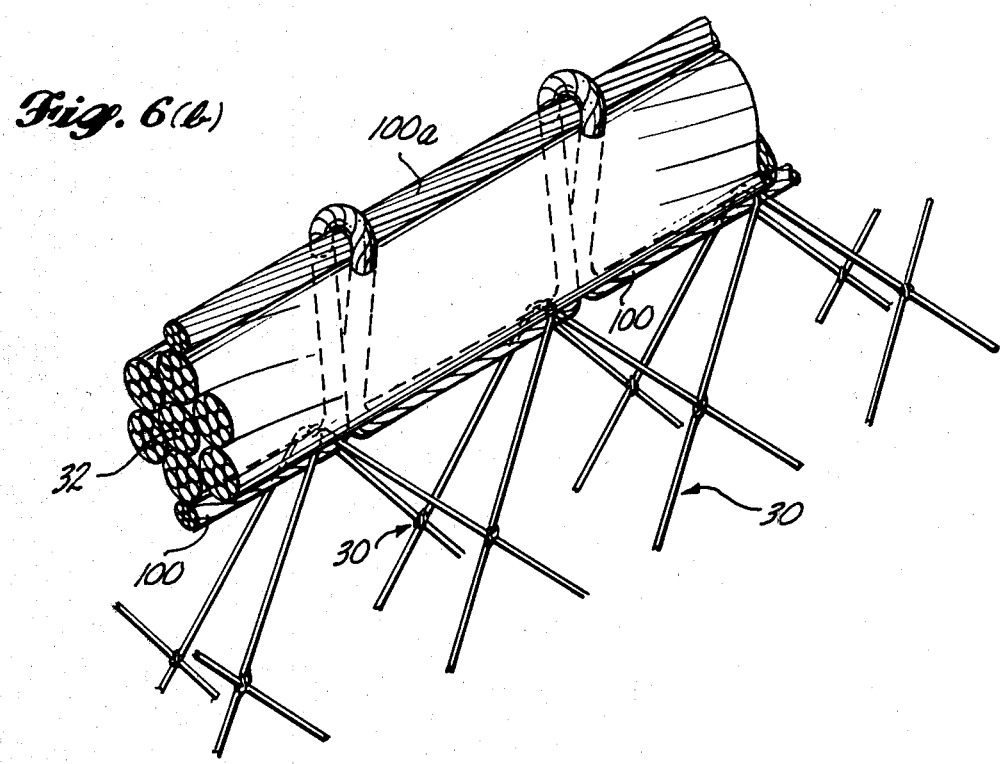
FIGS. 6(b) and 6(c) are corresponding views that illustrate alternative suspender line securement techniques that may be used for some applications.

In FIG. 6(b), the suspender line 32, of braided nylon or other polymer, is secured to the net by stitching directly through the line. Stitches 100 extending serially along the underside of the suspender line pick up each of the netting mesh intersections. A latching cord 100a extending along the top side of the suspender line holds the stitch return loops from pulling out of the suspender line.

Figure 6C:
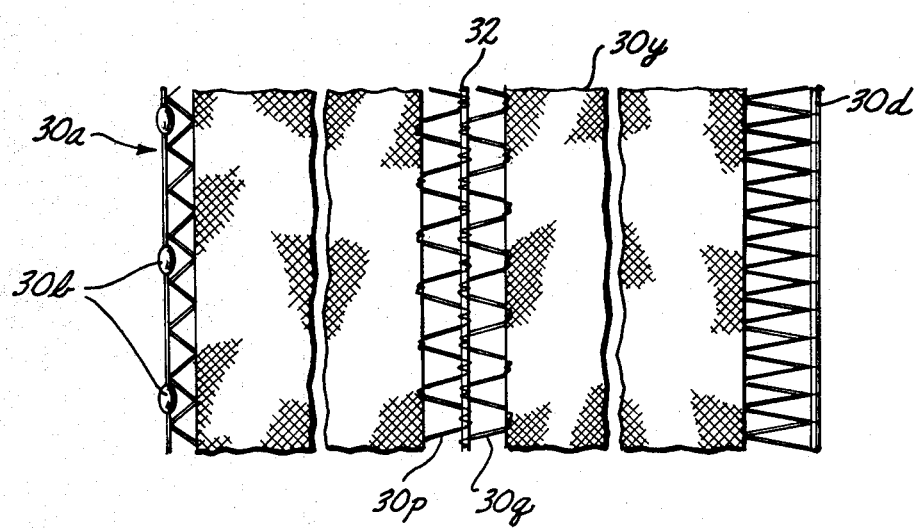

In FIG. 6(c) the net 30 is formed in two half-width panels 30x and 30y, the outer edge of one joined to the cork line 30a and that of the other joined to the lead line 30d. The inner net panels edges, spaced in parallel, are connected by longitudinally spaced lacings 30p and 30q to an intermediately positioned suspender line 32. The spacings between the panel edges and the suspender line and between successive lacing traverses may be made sufficient to pass fish readily, if desired, much as with some so-called "shaker" nets that have been used at times in gill netting.

As shown in FIG. 4, the split sheave support for the suspender line 32 comprises the cooperable rollers 24a and 24b having open end faces normally spaced apart by a gap g sufficient in width for the two panels of net 30 to drape and slide freely between them but much narrower than the diameter of the suspender line 32 cooperably supported by the upper peripheries of the two rollers. Preferably, the rollers are semi-conical in form so as to form a reentrant groove 24c that tends to maintain the suspender line in a central position. So centered, the line 32 maintains the netting aligned with gap g and thereby minimizes abrasion and wear of the net panels passing between the two sheave halfs 24a and 24b during net hauling. The roller 24a is rotatively supported on a cantilever shaft 24d on the lower end of support arm 24e while roller 24b is similarly on shaft 24f on support arm 24g. Arms 24e and 24g are pivotally connected to the ends of an upper hanger bar 24h so as to permit swinging the arms relatively together or apart. A transverse connecting bolt 24j is secured to arm 24g by a locking pin 24j'. The bolt 24j passes through a longitudinal slot in the opposite arm 24e. A compression spring 24k surrounding the body of the bolt 24j between the arms tends to press the arms apart. A knurled locking nut 24m on the threaded projecting end of the bolt 24j can be turned by hand in one direction to draw the arms together to a limiting position establishing the width of gap g against the recoil force of the compression spring 24k. When the nut 24m is turned in the opposite direction, the spring 24k spreads the two support arms apart so as to open the gap between the rollers 24a and 24b and thereby permit the suspender line 24 to drop downwardly through the space between the rollers.

A suspension shackle 38 of suitable form is secured to the hanger bar 24h so as to permit hanging the split sheave device from the frame bar 20c (FIG. 3). As depicted, the shackle may be suspended by a line 40 that passes through an overhead sheave 42 and a frame corner sheave 44 to a cleat 46 on the side of the frame. Taking up or letting out the line 40 permits raising and lowering the net guiding support device 24 to a suitable elevation relative to the deck level that will accommodate nets of different width and that will permit, of course, lowering the split sheave device 24 to the deck for stowage, repair or removal from the vessel as the occasion requires.

It is preferred that the net guiding support means shown as the split sheave device in FIG. 4 be a free turning rotative means that does not exert hauling or retarding friction or torque on the net during the hauling operation. As will be noted in FIG. 1, the net's midline 32 is maintained at an elevated position above deck level as the successive length portions of the two suspended or draped net panels approach the take-up device 10. It will be noted that the elevated positioning of the net guiding support 24 thereby imposes greater tension in the suspender line than that placed in the cork line and lead line. This is true inasmuch as the latter two lines are simply drawn across the open deck from the stern roller 12 to the take-up drum 10 whereas the suspender line 32 is required to follow a longer path produced by the upward deflection of the support 24. Thus, the suspender line 32 assumes a large part of the load-hauling tension normally assumed mainly by the lead line and cork line, and, of course, by the mesh itself in drawing the net from the stern roller to the take-up drum. However, the upward deflection imposed on the mid-portion of the net which causes it to drape downwardly from the support 24 also draws the net inwardly from the sides of the vessels to the central portion thereof so that both halves or panels of the net hang over the transverse central part of the deck area. This factor together with the gradual opening of the mesh in the process of approaching the draped, folded region passing the split sheave minimizes the loss of fish overboard, as well as facilitating removal of the fish from the net by shaking and picking operations. Even during manual net hauling or during hauling with the stern roller, the presence of the suspender line strengthens the net and provides a safe hand grasp by which to aid in hauling without breaking the small net mesh.

In the embodiment depicted in FIG. 7, it will be noted that the frame 20 in this instance is replaced by a longitudinally extending boom 200 with a guide track 50 mounted along its bottom side to support a split sheave device 24' at its forward end and a similar split sheave device 24" at its aft end, each device being similar to the device 24 in FIG. 3. The boom 200 may be raised and lowered on mast 202, and with it the two sheaves. If desired, the track 50 may be designed in any of different obvious ways to permit the devices 24' and 24" to be adjustably movable along the length of the track. The purpose of having the two longitudinally spaced sheaves in place of the single sheave in the first described embodiment is to provide increased longitudinal spread of the net panels lengthwise of the vessel in approaching the take-up drum 10, but in other respects, the operation is similar to that in the first described embodiment.

In the embodiment depicted in FIG. 8, the line guiding support device 24 is suspended some distance below the crossbar 20c of frame 20 and is connected to a mechanical shaker device represented in the example by the pneumatic or hydraulic jack 60 mounted pivotally at 62 on the inside face of one of the frame posts 20b. The opposite end of the jack is pivotally coupled to one side of the split sheave assembly 24 through a pivotal connection 64. Suitable hydraulic or pneumatic lines 66 connected to the cylinder of the jack 60 are coupled to a pressure source through a suitable means (not shown) causing reciprocative control operation of the jack so as to shake the suspended support device 24 back and forth transversely of the net, thereby to shake at least some of the fish from the mesh. Other forms of mechanical shaking devices may also be used if desired, including devices that shake the net up and down alternatively to or in addition to lateral shaking in a generally horizontal direction.

It will be noted that inasmuch as the two halfs or panels of the net suspended in draped fashion from the elevated net guiding support 24 are addressed to opposite sides of the deck of the vessel between the stern roller and the take-up drum 10, the system lends itself ideally to a two-man operation, with one person stationed at each side of the vessel to inspect and pick the net. This makes for a very fast hauling procedure, since full attention of both persons may be devoted to the operation with neither person interfering with the actions of the other. The net is hauled by progressive increments, with one operator having responsibility for operating the controls that turn on and off the drive for the hauling drum 10 to keep pace with the rate of picking or shaking the fish from the net. Inasmuch as the net is spread out, it is easy for the one operator to observe the condition of the net at both sides. In this manner the net can be hauled and unloaded of its fish, released from the grip of the support device 24 and reset to make another catch with minimum loss of time during favorable fishing conditions.

In use of the apparatus and in practicing the invention in its method aspects, the net may be hauled in over the stern roller 12 directly to the reel or drum 10, with the stern roller either free turning or with drive torque applied to it as an aid in the hauling. As an alternative technique, and one which will probably be used when hauling nets heavily loaded with sockeye salmon under conditions when there is not time to pick the net during hauling, the loaded net may be hauled and heaped on the stern deck area first, either manually or with the aid of the power driven stern roller 12. Thereafter, the net will be picked in the process of winding it on the reel 10 with the suspender line running over the net-elevating split sheave device of the invention.

In any event, a certain level of skill and alertness on the part of the fisherman will be important during net hauling in order to insure that the net continues to be properly presented to the net-elevating split sheave device as the net comes in over the stern roller 14. In that regard, skilled fishermen will readily appreciate that the factors of wind and tidal currents as well as the type of fishing being done (i.e., drifting for salmon or anchored for herring) will all have a bearing on coordinating the positioning and movement of the vessel relative to the net with the timing and rate control of net hauling.

These and other aspects of the improved net hauling and fish removal system will be evident to those familiar with this art and aware of the limitations of existing systems.

The embodiments of the invention in which an exclusive property or privilege is claimed are defined as follows:

1. A gill net comprising an elongated generally rectangular net having float means distributed along its upper edge and weight means distributed along its lower edge, and having a suspender line extending the length of the net substantially midway between such edges and of a thickness at least several times thicker than the net strands, and securing means fastening the suspender line to the net strands at a substantially uninterrupted succession of points along the length of the suspender line such that with the net folded in half along said suspender line and with the halves hanging suspended from said suspender line the stresses in the net will be distributed along the length of the line, said suspender line being secured to the net on one side thereof by means comprising a backing line a minor fraction of the diameter of the suspender line placed congruently to the suspender line on the opposite side of the net, the two lines being lashed together and to the intervening mesh of the net along the length of the lines, whereby the backing line defines the fold of the net when suspended beneath the suspender line.

2. In gill netting with an elongated generally rectangular gill net having float means distributed along its upper edge and weight means distributed along its lower edge, and having a suspender line at least several times thicker than the net strands maintained extending lengthwise of the net intermediate such edges by distributed securement thereof to the net strands along the line's length, the method of facilitating removal of fish from the net while drawing the net over deck area of a fishing vessel to a take-up device on the vessel that places the net in longitudinal tension, said method comprising maintaining the successive length portions of the tensioned net approaching said take-up device in draped configuration folded along a transversely intermediate fold line and forming two net panels suspended from said suspender line from an elevated net guiding support placed over said deck area in running engagement with said suspender line during net hauling, thereby to spread the net in the two panels of the net hanging from said suspender line in approaching said take-up device.

3. The method defined in claim 2, wherein the net is so supported and guided by running the suspender line over at least one revolving surface.

4. The method defined in claim 2, wherein the net is so supported and guided by running the suspender line over parallel revolving surfaces separated by a gap through which the net passes.

5. The method defined in claims 2, 3 or 4, wherein the net guiding support is shaken back and forth laterally to dislodge fish from the net panels.

* * * * *